US008688410B2

(12) United States Patent
Skidanov et al.

(10) Patent No.: US 8,688,410 B2
(45) Date of Patent: Apr. 1, 2014

(54) CABLE MANAGEMENT AND INVENTORY ENHANCEMENT

(75) Inventors: Nikolay Sergeevich Skidanov, Moscow (RU); Oleg Sergeyevich Evseev, Moscow (RW); Ksenia Alexeevna Sluchanko, Moscow (RU)

(73) Assignee: NetCracker Technology Corp., Waltham, MA (US)

( * ) Notice: Subject to any disclaimer, the term of this patent is extended or adjusted under 35 U.S.C. 154(b) by 408 days.

(21) Appl. No.: 13/077,310

(22) Filed: Mar. 31, 2011

(65) Prior Publication Data
US 2012/0253750 A1  Oct. 4, 2012

(51) Int. Cl.
*G06F 17/50* (2006.01)

(52) U.S. Cl.
USPC .................................. 703/1; 703/13

(58) Field of Classification Search
USPC ................................................. 703/1
See application file for complete search history.

(56) References Cited

U.S. PATENT DOCUMENTS

| | | | | | |
|---|---|---|---|---|---|
| 4,928,233 | A | * | 5/1990 | Millis | 345/419 |
| 7,117,162 | B1 | | 10/2006 | Seal et al. | |
| 8,271,423 | B2 | * | 9/2012 | Kawai et al. | 706/55 |
| 2003/0036983 | A1 | | 2/2003 | Hougen et al. | |
| 2007/0038415 | A1 | * | 2/2007 | Okada et al. | 703/1 |
| 2007/0090951 | A1 | | 4/2007 | Chan et al. | |
| 2009/0136333 | A1 | | 5/2009 | Schafer | |
| 2009/0216367 | A1 | | 8/2009 | Mejouev | |
| 2012/0158370 | A1 | * | 6/2012 | Logatoc | 703/1 |

OTHER PUBLICATIONS

Gomez, Augusto, "Integrated Ship Electrical Design", International Conference on Computer Applications in Shipbuilding, Aug. 24, 2005.*

Metcalfe, Roy, "The Application of Integrated Computing Technology to the Design, Construction and Lifecycle Support of Warships", Proceedings of the Warship 2010 Conference: Advanced Technologies in Naval Design and Construction, 2010.*
Brooks et al, "Improved Electrical Design Capabilities Through the Use of CAD Modeling", IEEE, 2004.*
Costa et al, "Variable Neighborhood Decomposition Search for the Optimization of Power Plant Cable Layout", Journal of Intelligent Manufacturing, 13, pp. 353-365, 2002.*
Meehan et al, "Computerized Circuit and Raceway Management", IEEE Transactions on Power Apparatus and Systems, vol. PAS-99, No. 4, Jul./Aug. 1980.*
Suh et al, "Integrated CAD System for Ship and Offshore Projects", International Journal of CAD/CAM, vol. 6, No. 1, 2006.*
International Search Report and Written Opinion for PCT/US2012;030651; issued Jun. 20, 2012; 9 pages.

* cited by examiner

*Primary Examiner* — Mary C Jacob
(74) *Attorney, Agent, or Firm* — Foley & Lardner LLP

(57) ABSTRACT

A cable-management system that integrates management information about infrastructure into objects and provides a visualization of cable and inventory objects within a building. An embodiment of the present invention comprises a computer-implemented cable management system comprising a cable module configured to manage at least one cable object associated with at least one physical cable and to automatically synchronize cable availability information with at least one inventory database, an infrastructure module configured to manage at least one infrastructure object associated with a building layout, wherein attributes of the at least one infrastructure object are associated with the at least one cable object, and a capacity module configured to calculate at least one utilization value associated with the at least one infrastructure object, whereby the at least one utilization value, the at least one cable object, and the at least one infrastructure object are integrated into a visualization of the building layout.

22 Claims, 18 Drawing Sheets

| Column Designator | Cable ID | Cable Type | Device A | Port A | Device Z | Port Z | Ladders Sequence |
|---|---|---|---|---|---|---|---|
| Column Description | Cable ID. Formed as per Naming Convention (TBD) imposed by the system. Unique across the inventory | Cable Type as specified in Cable Catalog | A-end Device/Distribution Frame the cable is connected to | Port on respective A-end Device/DF | Z-end Device/Distribution Frame the cable is connected to | Port on respective Z-end Device/DF | The sequence of ladders the cable uses to go from A to Z. ',' is a separator |
| Example of incoming value | CableID | Fiber Cable 1 | MUX_A | Port_A | MUX_Z | Port_Z | Ladder ID1, Ladder ID2, … Ladder IDN |

Fig. 5b

| Attribute | Attribute Type | Description |
|---|---|---|
| Type | List | List of cable types – UTP 3Cat, UTP 5Cat, Copper pair, Coax 50Ohm, Coax 75Ohm etc. |
| Vendor | List | List of vendors |
| Cross Section | Decimal | Cross-section of a cable |
| Mass per Unit length | Decimal | Mass of a cable per unit length |
| Armoring | List | List of cable armoring types |
| Protection | List | List of cable protection types |
| Breaking strength | Decimal | Cable breaking strength |

FIG. 5c

| Attribute | Attribute Type | Description |
|---|---|---|
| Cable tray | Reference to Cable Tray | Reference to a Cable Tray entity over which cable runs |

FIG. 5e

| Attribute | Attribute Type | Description |
|---|---|---|
| Device | Reference to Device | Calculated by the system as Device parent to Device Connector associated with first Cable Connector with the Plugged into attribute |

FIG. 5d

| Attribute | Attribute Type | Description |
|---|---|---|
| Cable tray A | Reference to Cable Tray | Reference to a Cable Tray entity where the cable goes out. Validation should be performed. Cable tray A and Cable tray Z cannot refer to the same Cable Tray object |
| Cable tray Z | Reference to Cable Tray | Reference to a Cable Tray entity where the cable comes in. Cable tray A and Cable tray Z cannot refer to the same Cable Tray object |

FIG. 5f

| Attribute | Attribute Type | Description |
|---|---|---|
| Cable tray | Reference to Cable Tray | Reference to a Cable Tray entity that connects different floors of the building |
| Cable tray A | Reference to Cable Tray | Reference to a Cable Tray entity where the cable comes into the vertical tray. Validation should be performed: Cable tray A and Cable tray Z cannot refer to the same Cable Tray object. Cable Trays specified in Cable Tray A and Cable Tray Z should belong to different Floor objects |
| Cable tray Z | Reference to Cable Tray | Reference to a Cable Tray entity where the cable goes out the vertical tray. Validation should be performed: Cable tray A and Cable tray Z cannot refer to the same Cable Tray object. Cable Trays specified in Cable Tray A and Cable Tray Z should belong to different Floor objects |

| Attribute | Attribute Type | Description |
|---|---|---|
| Layer Number | Number | Layer number, counted from the ceiling |

FIG. 6c

| Attribute | Attribute Type | Description |
|---|---|---|
| Highway Number | Number | The number of a highway in a location |
| Label | Number | Highway label, generated by the system as L<Layer Number> HW<Highway Number> where <Layer> is the number of the layer the highway is running on (parent Layer), and <Highway Number> is the value of the Highway Number attribute of the Highway |
| Weight Threshold | Decimal | Calculated by the system as specified in the Capacity Management section of the document |

| Attribute | Attribute Type | Description |
|---|---|---|
| Construction Type | List | List of cable tray types – Cable ladder, Solid trough, ventilated trough |
| Vendor | List | List of vendors |
| Standard size | Decimal | Standard length of a cable tray |
| Width | Decimal | Width of a tray |
| Depth | Decimal | Height of a tray |
| Maximum Allowed Weight | List | Max load allowed for a tray of the given length |
| Class destination | Decimal | 8A, 8B, 8C, 10A, 10B, 10C, 12A, 12B, 12C, 16A, 16B, 16C, 20A, 20B, 20C |
| Material | List | Steel, stainless steel, aluminum, glass-fiber reinforced plastic |
| Rung spacing | | Space between the rungs of a cable tray for cable ladder type |

FIG. 6d

| Attribute | Attribute Type | Description |
|---|---|---|
| Tray type | Reference to Cable Tray Type | Specifies Cable Tray Type from the Cable Tray Catalog |
| Length | Decimal | The length of the mounted cable tray |
| Width | Decimal | Width of a cable tray, retrieved from Cable Tray Type specified in Tray type attribute |
| Depth | Decimal | Depth of a cable tray, retrieved from Cable Tray Type specified in Tray type attribute |
| Max load | Decimal | Max load that can be carried by a cable tray. Calculated as <Length>*< Loading capacity >/<Standard size> where <Length> is the value of the Length attribute of a tray, <Loading capacity> and <Standard size> are derived from the corresponding fields of Cable Tray Type specified in the Tray type attribute of a tray |
| Cable Tray Label | Text | Label of a given Cable Tray. Unique within an Infrastructure container (Room/Floor) |
| Weight Threshold | Decimal | Specifies current load carried by a cable tray. The load is calculated as specified in the Capacity Management section of his document |
| Alarm Weight Threshold, % | Decimal | Specifies percentage of <Max load> for a tray which is considered as Alarm threshold by the system |
| Stop Weight Threshold, % | Decimal | Specifies percentage of <Max load> for a tray which is considered as Stop threshold by the system |
| Space Threshold | Decimal | Specifies current space occupied in a cable tray. The load is calculated as specified in the Capacity Management section of his document |
| Alarm Space Threshold, % | Decimal | Specifies percentage of tray area which is considered as Alarm threshold by the system. Tray area is calculated as <Width>*<Depth> |
| Stop Space Threshold, % | Decimal | Specifies percentage of tray area which is considered as Stop threshold by the system. Tray area is calculated as <Width>*<Depth> |
| Carried Cables | Reference to Cable | Calculated by the system. Shows all cables running over the Cable Tray. Cable is considered running over the Cable Tray if at least of its child Tray, Jump, or Vertical Tray object refer to it by Cable Tray attribute. |

FIG. 6e

| Attribute | Attribute Type | Description |
|---|---|---|
| X position | Number | Specifies X row position in a location measured in tile units. Tile unit size is defined on a parent site object |
| Y position | Number | Specifies Y row position in a location measured in tile units. Tile unit size is defined on a parent site object |

FIG. 6f

| Attribute | Attribute Type | Description |
|---|---|---|
| Cable row | Reference to Cable Row | Reference to a Cable Row entity under which cable runs |

FIG. 6g

| Attribute | Attribute Type | Description |
|---|---|---|
| Cable row A | Reference to Cable Row | Reference to a Cable Row entity under which cable runs before it turns into other direction. Validation should be performed: Cable row A and Cable row Z cannot refer to the same Cable Row object. |
| Cable row Z | Reference to Cable Row | Reference to a Cable Row entity under which cable runs after it turns into other direction. Validation should be performed: Cable row A and Cable row Z cannot refer to the same Cable Row object. |

FIG. 6h

CABLE MANAGEMENT AND INVENTORY ENHANCEMENT

FIELD OF THE INVENTION

The present invention generally relates to the field of cabling infrastructure management.

BACKGROUND OF THE INVENTION

Cable management within a telecommunications infrastructure is a complicated task because of the large number and different types of cables used within operations centers. A modern network operations center may host tens of thousands of pieces of equipment, and the number of cables needed to connect the equipment can exceed one million in many cases. Often a cable management team handles the cable infrastructure, dealing with maintenance and support issues to ensure that the cable infrastructure is stable and reliable.

Managing the vast number of cables that are used in a large operations center can be a challenge even with current cable management tools because these tools do not account for cable structure and infrastructure capacity. Additionally, information associated with cables, such as cable cost and cable infrastructure capacity, is difficult to manage because current management tools focus on what cables look like rather than their logical structure and other related attributes.

SUMMARY OF THE INVENTION

A cable management system exemplary of the present invention provides a comprehensive approach to cable management within an operations center that integrates information about the infrastructure into inventory objects that are managed through the cable management system. This improved system allows for more efficient resource management and planning because more information regarding individual cables and devices within the operations center is available to a user.

Another advantage is associated with cost management and impact analysis because individual cables and resources are tracked when in inventory and when in use, which allows resources to be used more effectively without unnecessary duplication, in inventory or in use within the operations center, when a network configuration needs to be changed.

Yet another advantage is associated with the use of a visualization of a building infrastructure that allows a cable layout to be presented so that a user is able to determine the current connectivity and layout of individual cables within the building infrastructure to facilitate cable tracing and also monitor usage capacities of the infrastructure.

One embodiment of the present invention provides a computer-implemented cable management system comprising a cable module configured to manage at least one cable object associated with at least one physical cable and to automatically synchronize cable availability information with at least one inventory database, an infrastructure module configured to manage at least one infrastructure object associated with a building layout, and a capacity module configured to calculate at least one utilization value associated with the at least one infrastructure object. In one example, attributes of at least one infrastructure object are associated with at least one cable object. In another example, at least one utilization value, at least one cable object, and at least one infrastructure object are integrated into a visualization of a building layout.

According to another feature of the present invention, at least one cable object may be represented using a cable object model. According to another feature, at least one infrastructure object may be represented using an infrastructure object model. According to another feature of the present invention, an infrastructure module may be configured to automatically synchronize infrastructure availability information with at least one database.

According to one feature of the present invention, the capacity module is configured to determine whether at least one utilization value exceeds at least one pre-defined threshold value. In one example, one pre-defined threshold value may be at least one of a space value or weight value. In another example, a pre-defined threshold value may be less than a maximum capacity value.

According to another feature of the present invention, a visualization comprises a graphical display that illustrates an actual path of at least one cable object through at least one infrastructure object. In one example, the graphical display of the actual path may be based at least in part on at least one utilization value. In another example, the graphical display represents an isometric view of the actual path of the at least one cable object such that the isometric view shows at least two cabling layers.

Another embodiment of the present invention provides a computer-implemented cable management method for creating at least one cable object that corresponds to at least one physical cable, creating at least one infrastructure object that corresponds to at least one physical infrastructure organization component in a building infrastructure, automatically synchronizing cable availability information with at least one inventory database, and generating a representation of a layout associated with the at least one cable object and at least one infrastructure object. According to one feature of the present invention, attributes of the at least one infrastructure object may be associated with the at least one cable object. According to another feature of the present invention, at least one utilization value may be incorporated into the representation.

Another feature of the present invention provides for automatically synchronizing infrastructure availability information with at least one database. In another feature of the present invention, instantiating an object based on a cable object model comprises retrieving information from a cable catalog. In another feature, generating a representation of a layout comprise incorporating the layout into a graphical representation of a building infrastructure such that the layout corresponds to an actual path of at least one physical cable. According to still another feature of the present invention, generating a representation of a layout comprises altering the representation of the layout based on at least one of a weight utilization or space utilization. In one example, a weight utilization may be calculated based on attributes of the at least one cable object and at least one infrastructure object. In another example, a space utilization may be calculated based on at least one cable object and at least one infrastructure object. Another feature of the present invention comprises determining whether at least one utilization value exceeds at least one pre-defined threshold value.

Another embodiment of the present invention provides a non-transitory computer-readable medium having computer-readable instructions stored thereon to cause a computer to execute a process comprising creating at least one cable object that corresponds to at least one physical cable, creating at least one infrastructure object corresponding to at least one physical infrastructure organization component in a building infrastructure, wherein attributes of the at least one infrastructure object are associated with the at least one cable object, automatically synchronizing cable availability information with at least one inventory database, and generating a representation of a layout associated with the at least one cable object and at least one infrastructure object, wherein at least one utilization value is incorporated into the representation.

Other aspects and features of the present invention will become apparent to those of ordinary skill in the art upon review of the following description of specific embodiments of the invention together with the accompanying figures.

BRIEF DESCRIPTION OF THE DRAWINGS

FIG. 5b illustrates an exemplary storage format for a Cable Object Model structure.

FIG. 5c illustrates an exemplary Cable Type object.

FIG. 5d illustrates an exemplary Cable End object of a Cable object.

FIG. 5e illustrates an example of a Tray object.

FIG. 5f illustrates an exemplary Jump attribute associated with a Cable Tray.

FIG. 5g illustrates an example of a Vertical Tray object.

FIG. 6b illustrates an example of a Layer object.

FIG. 6c illustrates an example of a Cable Highway object.

FIG. 6d illustrates an exemplary Cable Tray type object.

FIG. 6e illustrates an exemplary Cable Tray object.

FIG. 6f illustrates an exemplary Cable row object.

FIG. 6g illustrates an example of a Row attribute of a Cable object.

FIG. 6h illustrates an example of a Turn object.

DETAILED DESCRIPTION OF THE PREFERRED EMBODIMENTS

Figure 1:
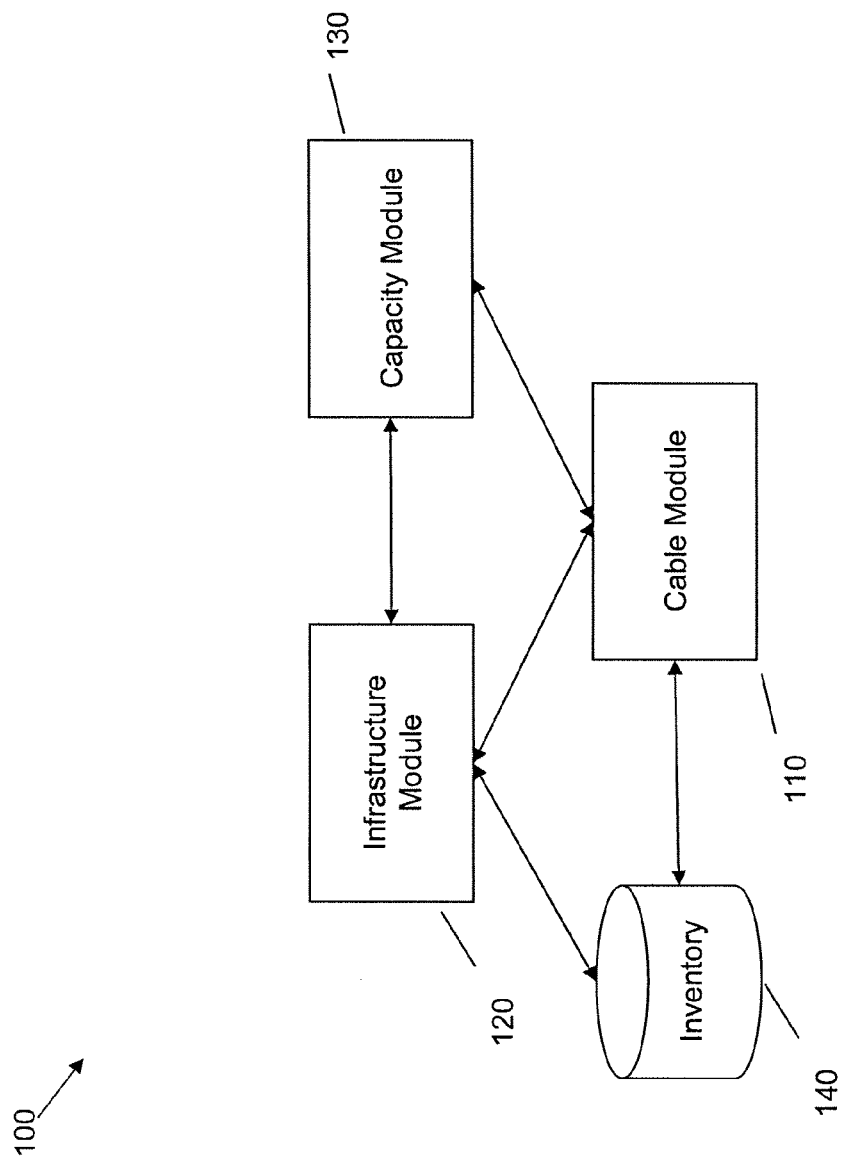
FIG. 1 is a block diagram overview of an exemplary embodiment of the present invention.

FIG. 1 illustrates a block diagram of an exemplary cable management system 100. More specifically, cable management system 100 shows a cable module 110, an infrastructure module 120, a capacity module 130, and an inventory database 140. The cable module 110 is configured to manage at least one cable object that represents a physical cable used as part of a network infrastructure. The cable object is represented as part of the cable module 110 as an instance of a Cable Object Model (COM). The COM provides an object-oriented approach to representations of physical cable, which allows COM cable objects to be integrated with other components of the cable management system, as will be discussed in further detail below. In one embodiment, cable module 110 is configured to send and receive inventory information to and from inventory database 140 that may be used to monitor inventory status for the network infrastructure. Additional features of the COM will be discussed below with respect to FIG. 5a.

In an exemplary embodiment, infrastructure module 120 is configured to manage and communicate information regarding aspects of the infrastructure in which the cable management system 100 is implemented. Infrastructure module 120 manages at least one cable tray object or cable row object related to the physical network configuration within the infrastructure. The cable tray object or cable row object is represented as an instance of a Infrastructure Object Model (IOM) that represents individual components of the cabling infrastructure as objects with attributes related to the actual component. In one embodiment, infrastructure module 120 is configured to send and receive inventory information to and from inventory database 140 that may be used to monitor inventory status for the network infrastructure. In addition, the individual components may be related to the actual infrastructure type within the network environment. For example, some infrastructures may use in-ceiling cabling or raised-floor cabling, or some combination thereof, and the infrastructure module 120 provides a representation of the objects related thereto.

Capacity module 130 is configured to calculate capacity-related information based on cable and infrastructure information. In an exemplary embodiment, capacity module 130 calculates a capacity for a cable tray or row carrying at least one cable object implemented as part of a network configuration. Capacities may be determined based on stored characteristics of cable objects and infrastructure objects. Capacity may be related to weight of cables in one embodiment. In other embodiments, capacity may relate to the storage capacity of particular infrastructure components that organize cabling.

Figure 2:
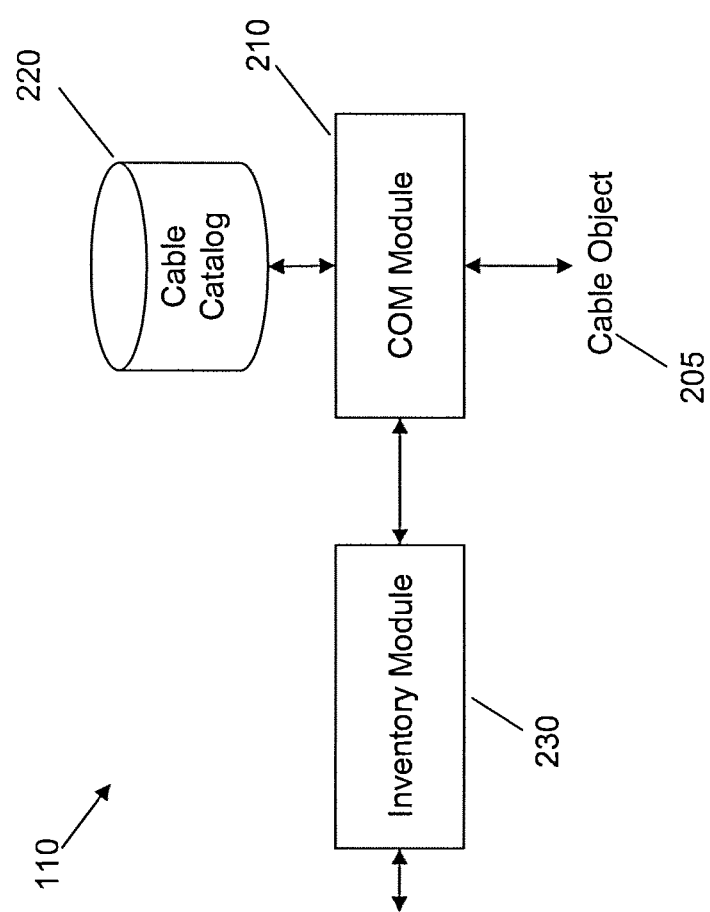
FIG. 2 is a block diagram illustrating a Cable Module according to an embodiment of the present invention.

FIG. 2 shows the cable module 110 in greater detail. More particularly, FIG. 2 illustrates a COM module 210, a cable catalog 220, and an inventory module 230. COM module 210 is configured to generate cable objects that represent physical cables that can be implemented within a network communication environment, such as cable object 205. Cable catalog 220 is configured to provide a number of predefined cable types or templates based on cable vendors' specifications for the creation of cable objects, such as cable object 205.

COM module 210 may be configured to create cable objects with different attributes stored as part of the cable types or templates by cable catalog 220, such as a cable type, vendor, cross-section size, mass per unit strength, armoring, and other attributes that may vary between physical cables. Based on the information received from cable catalog 220, COM module 210 may create at least one cable object to represent new cables that are installed within the physical network infrastructure.

In one embodiment, the availability of new cables that may be added by COM module 210 is determined according to input from inventory module 230, which manages the availability of cables that may be added to the network infrastructure. For example, if a user wishes to add a new cable to the network infrastructure by instructing COM module 210 to create a new cable object, inventory module 230 is configured to determine whether there are adequate cable objects stored in inventory database 140 to satisfy such a request. Cable objects stored in the inventory database 140 correspond to physical cables that are physically available for use so that an accurate accounting of cables may be maintained. Furthermore, if cable objects are instantiated or changed and added to the network infrastructure, inventory module 230 may update the inventory database so that it reflects the current status of the physical network infrastructure and availability of physical network cables.

Figure 3:
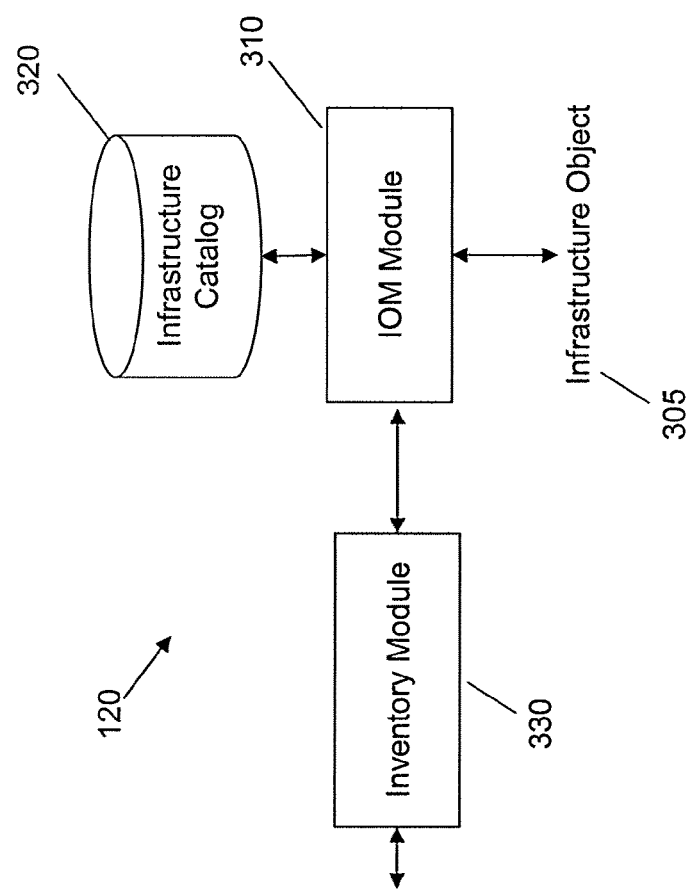
FIG. 3 is a block diagram illustrating a Infrastructure Module according to an embodiment of the present invention.

FIG. 3 illustrates additional details of the infrastructure module 120. In particular, FIG. 3 shows an IOM module 310, infrastructure catalog 320, and infrastructure inventory module 330 that are operatively connected and configured to generate and manage infrastructure objects, such as infrastructure object 305. In one embodiment, the TOM module 310 is configured to create at least one infrastructure object, such as a Cable Tray, with certain attributes, such as a construction type, vendor, physical dimensions, loading capacity, rung spacing, and other attributes related to the infrastructure object.

Information regarding these and other attributes may be provided by infrastructure catalog 320 based on stored information regarding the particular type of infrastructure object that IOM module 310 seeks to create. Infrastructure catalog 320 stores information related to a variety of different types of infrastructure objects, such as infrastructure object 305, so that the stored attributes of an infrastructure object instantiated by IOM module 310 to reflect the attributes of the physical infrastructure object that corresponds to the instantiated object, which may be stored by infrastructure inventory module 330 in the inventory database 140.

In one embodiment, infrastructure objects created by IOM module 310 and stored by infrastructure inventory module 330 relate to different layout or organizational structures within a network infrastructure. For example, if the network infrastructure uses a raised floor system to handle cabling between connected components, then instantiated infrastructure objects may be components such as a cable row designed to work with a raised-floor cabling system. In one embodiment, a cable row represents a combination of floor panels within the infrastructure that allows the cable path to be traced below the floor. Similarly, the infrastructure may include a set of cable trays and jumps to produce different cabling paths. In addition, cable trays arranged sequentially to form linear cabling structures may be configured to create cable highways. These and other infrastructure objects used as part of the network infrastructure may be arranged vertically to create layers when physically installed, and corresponding infrastructure objects similarly include attributes related to the layer of the infrastructure to which they correspond. Intersections between cable trays on different levels and cable jumps between trays along the cable route also may be included.

Figure 4:
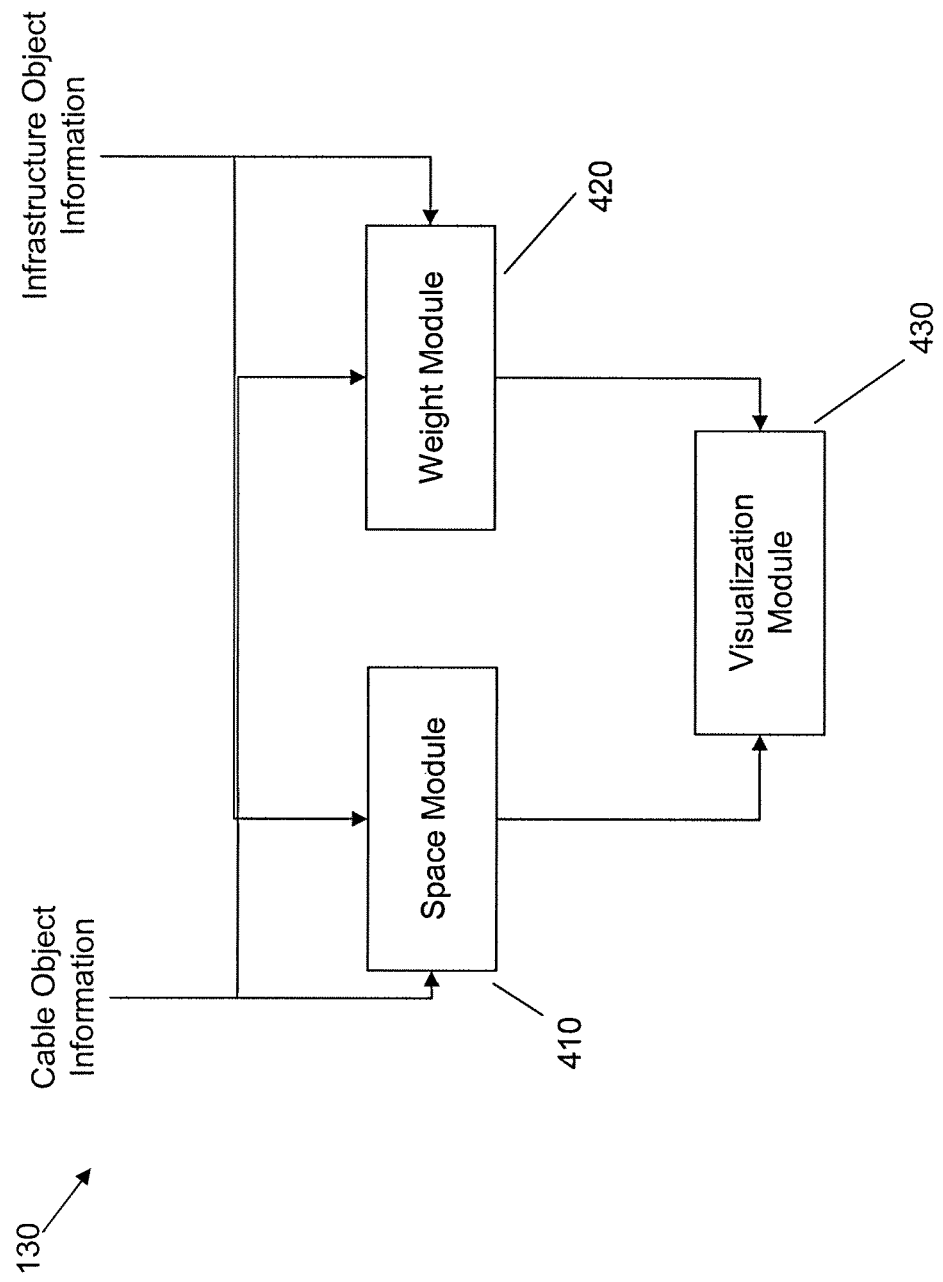
FIG. 4 is a block diagram illustrating a Capacity Module according to an embodiment of the present invention.

FIG. 4 shows the capacity module 130 in greater detail. More specifically, FIG. 4 depicts a space module 410, a weight module 420, and a visualization module 430. Space module 410 is configured to receive sizing and capacity information related to infrastructure objects and cable objects to determine current capacity utilization levels. In one embodiment, space module 410 is configured to receive information such as cross-section information regarding each cable that is associated with a particular infrastructure object to determine the amount of space needed for each cable to pass through the infrastructure object. In addition, space module 410 is configured to receive information regarding infrastructure objects associated with particular cables to determine, for example, physical dimensions, loading capacity, and other attributes related to the pass through size that the particular object is able to provide for related cable objects.

In one embodiment, space module 410 may calculate the effective space in use for a particular infrastructure object based on a space utilization. The space utilization may be calculated as $100 \times 4/\pi \times (\Sigma(\text{Cable cross-section area i}) + \Sigma(\text{Cable cross-section area j})) \div (\text{Cable Tray cross-section area})$. The cable cross-section area is the value of the cross-section area attribute of a cable running through the tray, i represents each cable entering and exiting the specific cable tray, j represents each cable entering the specific cable tray and exiting in the middle to a cable tray on a different layer or entering the specific cable tray from another layer, and cable tray cross-section area is the value of the cross-section area attribute of the specific cable tray. The summation over all i and j values provides the space utilization for a specific cable tray.

To determine the maximum space utilization along a particular cable highway in the network infrastructure, space module 410 may calculate in an exemplary embodiment: Max(Cable Tray Space Utilization i) where "Max" is a function that calculates a maximum value, i represents each cable tray along a particular cable highway, and Cable Tray Space Utilization is the space utilization value for each individual cable tray along the highway. The maximum value over all the i cable trays along the highway represents the peak space utilization in cable trays along the highway.

In another embodiment, weight module 420 is configured to receive weight capacity information regarding cable objects to determine weight capacity utilization levels. Such information may include cable length and cable density for individual cable objects that are in use in a network infrastructure. Weight module 420 is further configured to receive weight capacity information regarding various infrastructure objects through which cable objects pass to determine the amount of additional cable weight that the infrastructure can support. For example, a weight utilization within a Cable Tray may be calculated as $100 \times ((\text{Cable tray length}) \times (\Sigma(\text{Cable Density i}) + 0.5 \times \Sigma(\text{Cable Density j}))/(\text{Cable Tray Maximum Allowed Weight})$. Cable Tray Length is the physical length of a cable tray, Cable Density is a weight per meter length for each cable i, i represents each cable entering and exiting the specific cable tray, j represents each cable entering a specific cable tray and exiting in the middle to a cable tray on a different layer or entering the specific cable tray from another layer, and Cable Tray Maximum Weight is a maximum weight the specific cable tray can sustain according to it's specified attributes.

To calculate the weight utilization over a cable highway, weight module 420 may calculate Max(Cable Tray Weight Utilization i) where "Max" is a function to calculate a maximum value, i represents each cable tray along a particular cable highway, and Cable Tray Weight Utilization is the local weight utilization for each individual cable tray along the highway. The maximum value over all the i cable trays represents the maximum weight carried by a Cable Tray with the current cable layout over the highway.

Individual alarm and stop thresholds may be specified for the space and weight capacities. In one embodiment, capacity module 130 is configured to store at least one alarm threshold for a space utilization, such that if the threshold is exceeded for a particular infrastructure object, a message, such as an email message, is generated and provided to the user even though a maximum capacity value for the infrastructure object has not been exceeded. Also, the alarm threshold may relate to a cable highway to alert the user if the threshold for a cable highway is exceeded. Similarly, one of ordinary skill in the art will recognize that alarm thresholds may be provided for weight utilization as well.

A stop threshold may also be provided for both weight and space utilization. In an exemplary embodiment, if adding a cable object to an infrastructure object would cause a stop threshold to be exceeded, the cable object will not be added. The value associated with the stop threshold may be provided according to the specifications of particular infrastructure objects that would be used by the new cable object or may be specified by a user. In one embodiment, the stop threshold for one or more infrastructure objects corresponds to the maximum capacity value associated with those objects. In another embodiment, the user specifies a particular value as the stop threshold for one or more objects. In either situation, the cable object is not added, and the user is notified that the stop threshold would be exceeded.

Space module 420 and weight module 410 also may be configured to re-calculate utilization information and infrastructure capacities. In one embodiment, weight module 420 and space module 410 are configured to automatically re-calculate at least one current capacity utilization measurement when a cable object is added, disconnected, or removed from the building infrastructure or if the composition of the building infrastructure is changed.

Visualization module 430 is configured to provide a visualization of information related to a current network configuration. In an exemplary embodiment, visualization module 430 provides a representation of at least one cable object based on current attributes, including connections and routing path through the network infrastructure, including any infrastructure objects associated with the path of the physical cable. Also, visualization module 430 may be configured to provide a graphical representation that integrates the routing path of at least one cable object through a network configuration, where components are located in locations corresponding to their actual physical location within a building infrastructure. In one embodiment, the graphical representation is based on the configuration of the building infrastructure, including the cabling organization method and type of infrastructure components used, whereby the objects provided in the graphical representation correspond to the physical components in use.

Figure 7A:
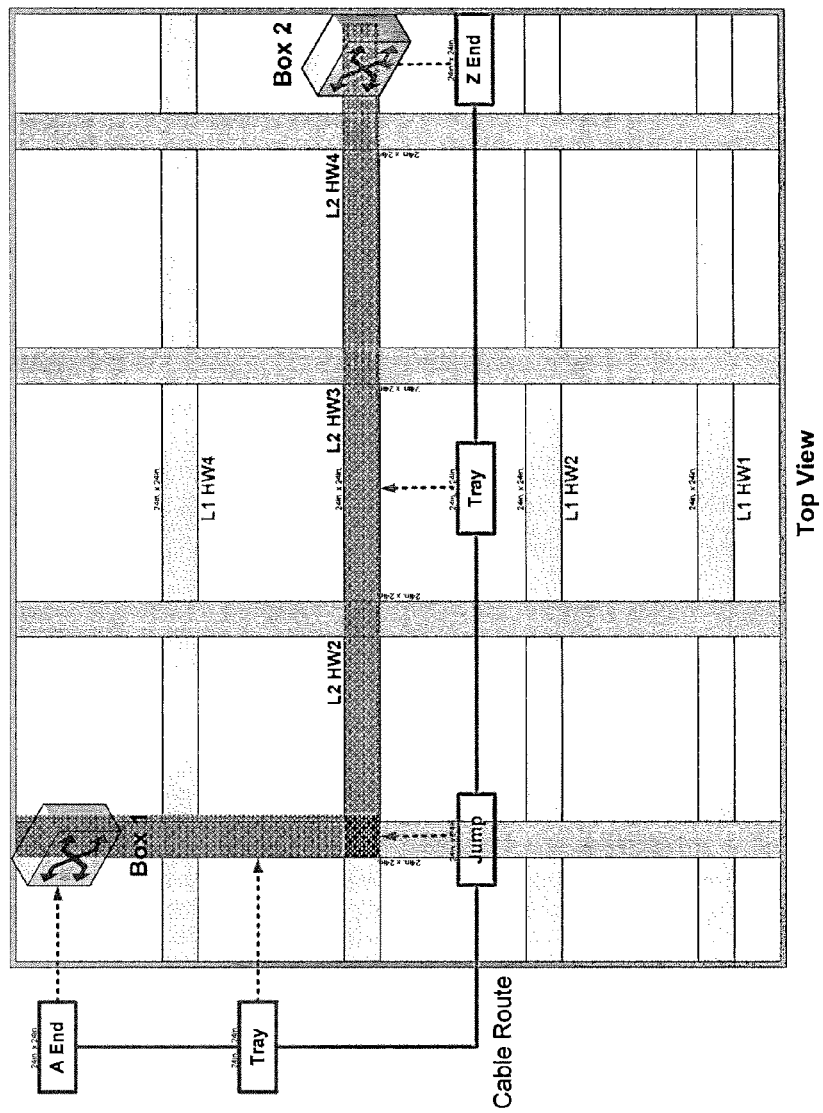
FIG. 7a illustrates an exemplary visualization of a cabling infrastructure and a cable route on top of it.
Figure 7B:
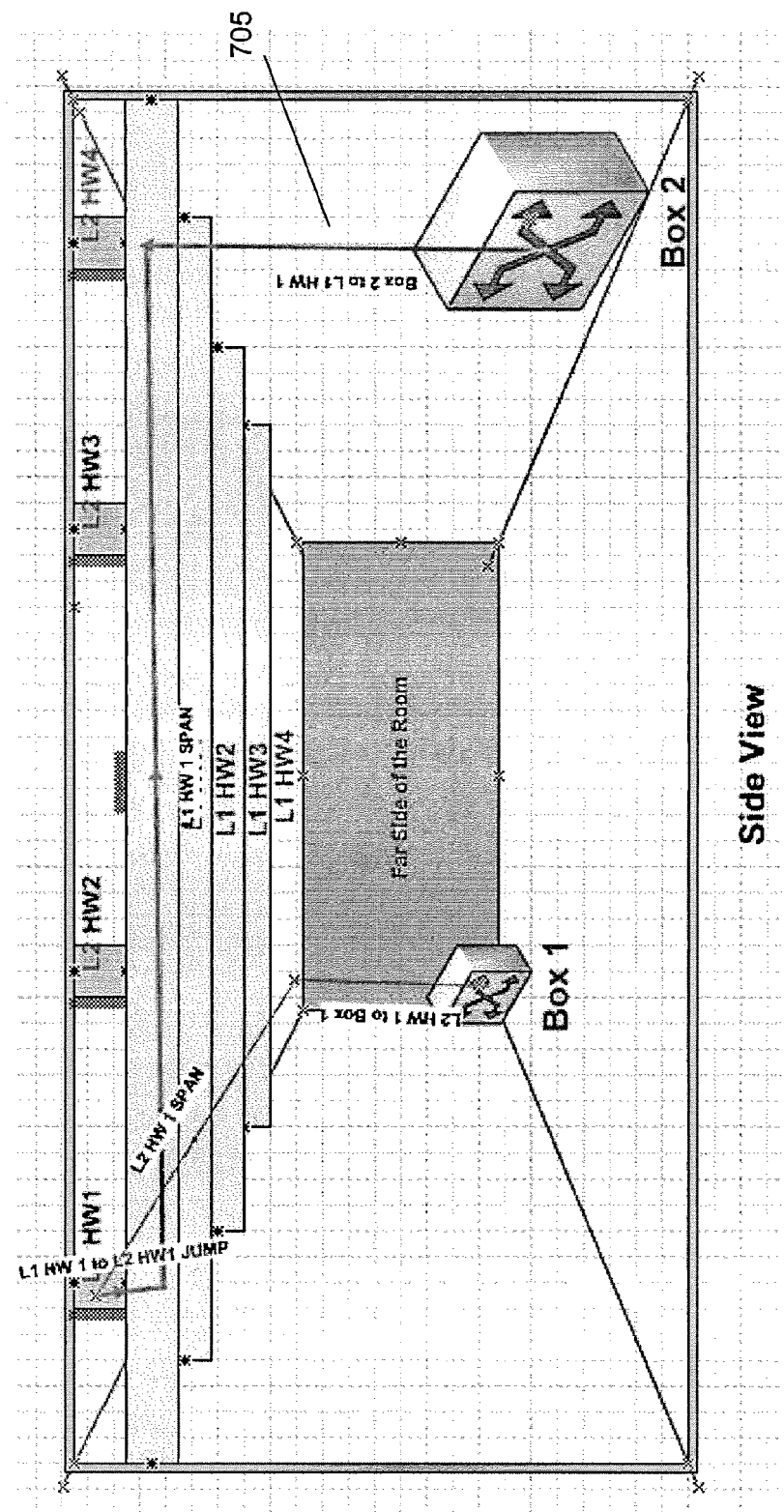
FIG. 7b illustrates an exemplary side-view visualization of a cabling infrastructure.

In another embodiment, visualization module 430 also receives capacity utilization information from space module 410 and weight module 420 to incorporate current capacity information into the visualization. For example, the visualization may include color-coded paths where different colors represent different capacity utilization levels such that a user may easily ascertain the current available capacity of infrastructure components in the current infrastructure. In another embodiment, visualization module 430 may provide different perspectives of the infrastructure layout such that a user may determine, for example, the layer of cabling used by a particular physical cable in use within the building infrastructure. Visualizations created by visualization module 430 are configured to be accessible in their text-based or graphical format through a device, or they may be exported to a standard file format that can be printed or otherwise displayed to the user to use in the field. FIGS. 7*a* and 7*b* provide illustrative examples of graphical visualizations generated in accordance with the present invention.

Figure 5A:
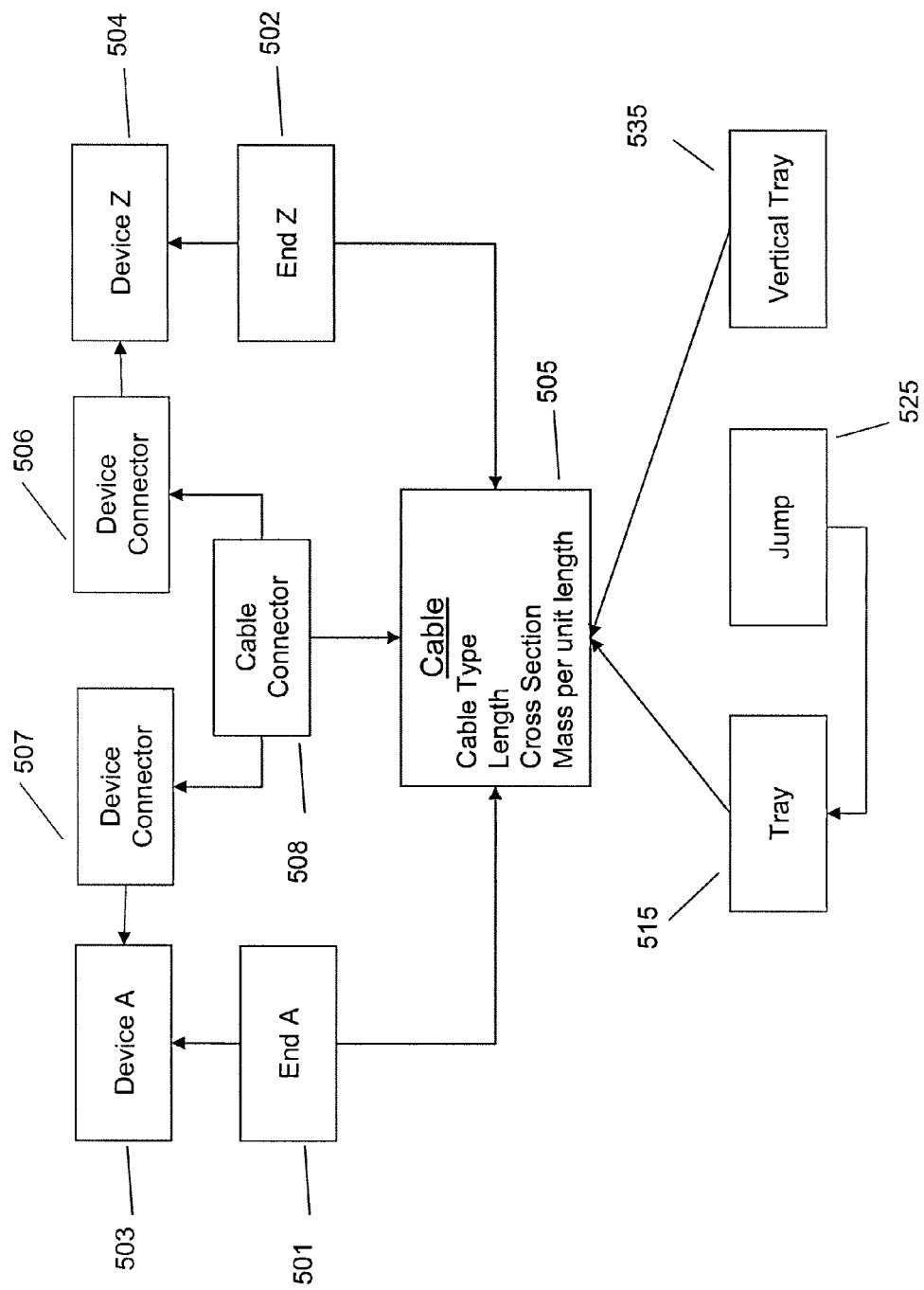
FIG. 5a illustrates an exemplary Cable Object Model structure.

FIG. 5*a* illustrates one example of a cable object model that facilitates locating, managing, and removing cables within an infrastructure using a cable object, which provides an organized view of a cable's attributes and connectivity. As shown in this example, cable object 505 includes attributes such as cable type, length, cross-section, and density. The cable type associated with cable object 505 may be defined according to attributes as shown in FIG. 5*c*. In addition, cable object 505 contains attributes related to its current path and connectivity. As shown in this example, cable object 505 includes a tray attribute, shown as tray 515 and in further detail in FIG. 5*e*, and a jump attribute 525 that is associated with two trays referenced in tray 515 to represent the cable's path leaving one tray in the middle and continuing to a different tray. Cable object 505 is also associated with vertical tray 535. As will be understood to one of ordinary skill in the art, the infrastructure objects in this example are related primarily to an overhead cabling structure, but an in-floor or other cabling structure may be used with corresponding infrastructure objects as well.

Cable object 505 also includes connectivity information, such that one end—for example End A 501—is associated with Device 503, and the other end—End Z 502—is associated with Device 504. Cable ends A and Z, stored as attributes of the cable object 505 also include information regarding the type of cable end (e.g. RJ-45) associated with the cable object. A cable end object may be represented as shown in FIG. 5*d*. Furthermore, cable connector 508 has a "connected-to" relationship with device connectors 506 and 507 because cable 505 provides a connection between the devices 503 and 504 that are respectively with each device connector.

Tray 515 and vertical tray 535 are both cable tray infrastructure objects that have attributes specified in according to attributes stored in the infrastructure catalog module 320 discussed previously, and each object includes information regarding the cable objects that pass through it. Tray 515 may be one of several cable tray objects specified as being associated with cable object 505 because the physical cable associated with cable object 505 runs through those cable trays. An exemplary tray object is shown in FIG. 6*e*. Jump 525 is also associated with cable object 505 for similar reasons to cable tray 515, but jump 525 also includes specific information regarding the other infrastructure objects it connects. In this example, jump 525 connects cable tray at one level to a cable tray at another level. Jump 525 specifies the cable trays that are the "source" and "destination" trays that intersect at the jump 525 for this particular cable object 505. One example of a jump object is depicted in FIG. 5*f*. Finally, vertical tray 535 is similarly associated with cable object 505, but it is a tray oriented in a vertical direction, such that it connects interconnecting floors of the building that is part of the network infrastructure. For example, vertical tray 535 is associated with cable object 505 because cable object 505 passes over vertical tray 535 on its path from floor A to floor Z, as shown in the figure. An exemplary vertical tray object is shown in FIG. 5*g*.

FIG. 5*b* illustrates an exemplary format for storing cable object information, such as the information discussed above with respect to FIG. 5*a*. As shown, the cable format stored in an inventory system or other database may include information such as a Cable ID, Cable Type, connected devices, port to which it is connected, and layout path information within the building infrastructure. One of ordinary skill in the art will recognize that this format is just one example and that other similar formats are possible.

Figure 6A:
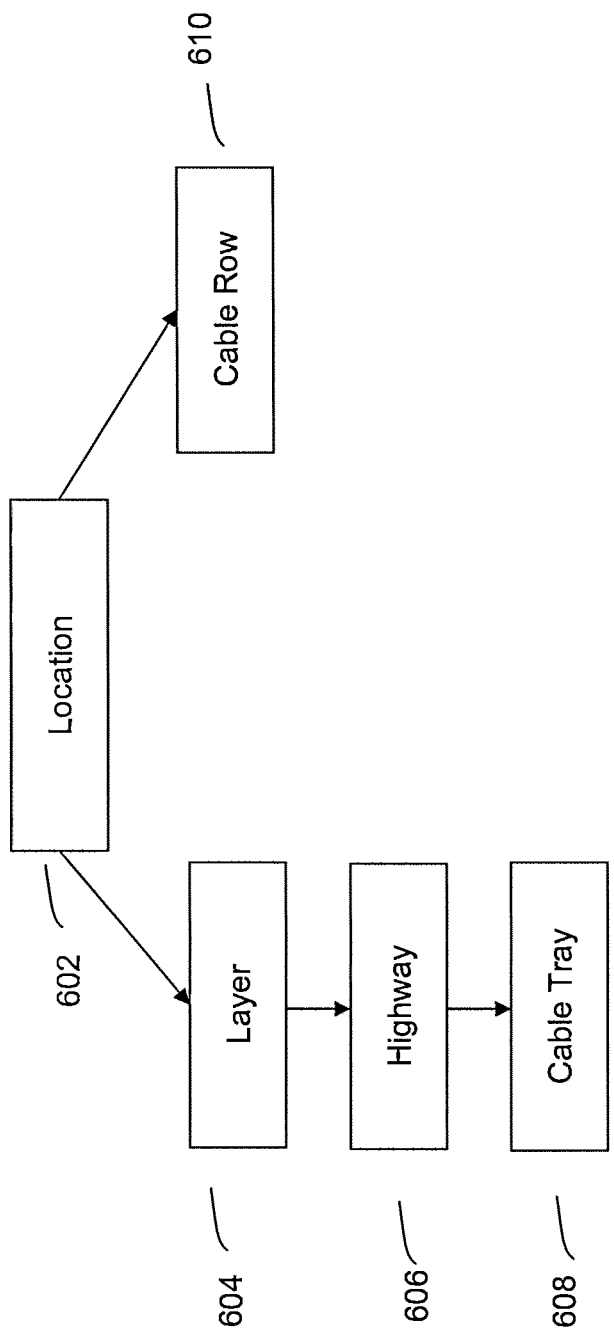
FIG. 6a illustrates an exemplary Infrastructure Object Model structure.

FIG. 6*a* illustrates an exemplary infrastructure object model. As shown, a location object 602 is configured to be associated with multiple other objects related to the infrastructure. Location object 602 may also represent a particular room or site within an infrastructure. In one embodiment, location object 602 is associated with a layer object 604 that corresponds to a layer of the cabling infrastructure within the location associated with location object 602. An exemplary layer object is depicted in FIG. 6*b*. Each highway object associated with the location object 602, such as highway object 606 and as shown in further detail in FIG. 6*c*, is also related to a layer within the infrastructure, such as layer 604. A cable tray object 608 represents a single cable tray within the infrastructure and is associated with a cable highway within the infrastructure, such as highway object 606. An exemplary set of attributes associated with a cable tray type is shown in FIG. 6d, and a representation of a cable tray object, such as cable tray object 608 is shown in FIG. 6e. In another embodiment, location object 602 may be associated with a cable row object 610 if the infrastructure uses, for example, a raised floor system for managing network cabling. Cable row object 610 represents a row of flat floor panels that cover a grid that forms the raised floor within the infrastructure. If location object 602 is associated with floor row object 610, the space in a particular location may be measured in terms of the tile units, and each floor row object may be assigned an identifier based on the row position of that particular tile. An exemplary representation of a floor row object is shown in FIG. 6f. Further, a cable row object may be associated with an individual Cable based on its row child objects, as represented in FIG. 6g. A turn object of the cable may also be associated with one more more cable row objects, and one embodiment of a turn object is illustrated in FIG. 6h.

FIG. 7a illustrates an example visualization of an overhead view of a cable route showing the actual path of a cable through a building infrastructure. As shown, this exemplary visualization includes information related to the various infrastructure objects through which the cable object A passes. Cable object A connects Device A with Device Z, where the cable object passes over the path through the building infrastructure as shown. In addition, the path may be displayed using, for example, different colors based on the capacity of individual infrastructure objects or cable highways that the cable passes over.

FIG. 7b illustrates an isometric, side view visualization of an exemplary cable route similar to the route in FIG. 7a that shows the actual path of a physical cable through a building infrastructure, where the layers of the cable infrastructure are visible. As shown, "Box 1" represents a device at the far end of a room within the building infrastructure, and "Box 2" is a device is on the near end of the same room. Cable object 705 connects Box 1 with Box 2 by traversing the illustrated path over infrastructure objects similar to those illustrated in FIG. 7a.

Figure 8:
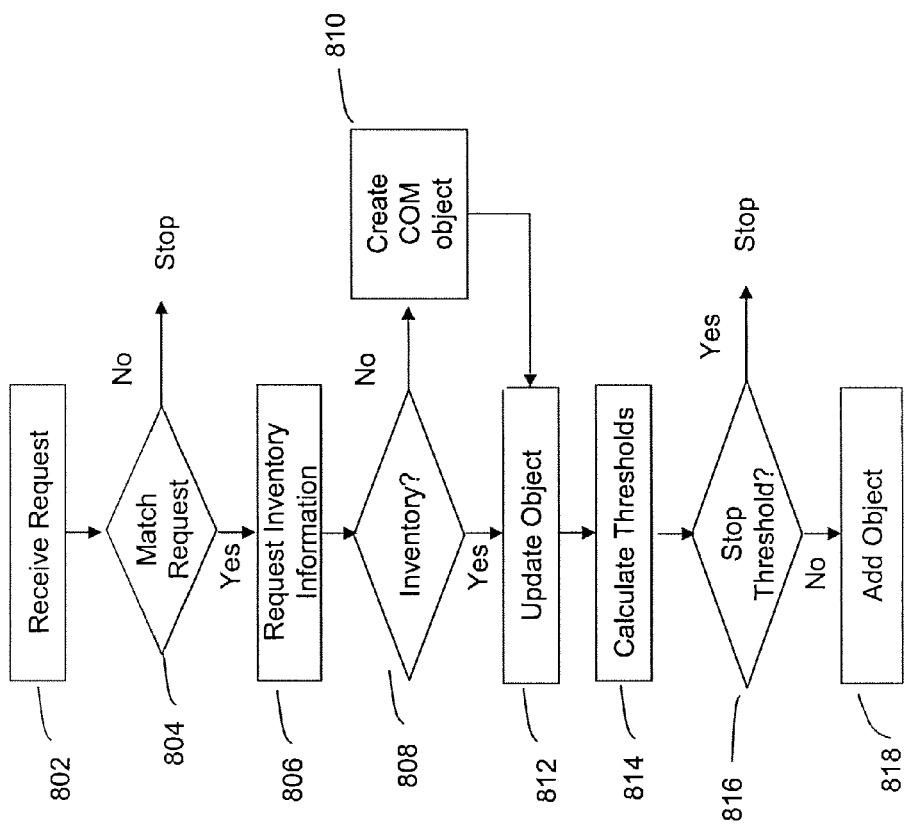
FIG. 8 is a flow diagram illustrating a process for adding a cable object to a cabling infrastructure.

FIG. 8 illustrates a process for adding a cable or infrastructure object to the building infrastructure. In an exemplary embodiment shown in the Figure, the process is illustrated with respect to a cable object, but one having ordinary skill in the art would recognize that a similar process is carried out with respect to an infrastructure object. At Step 802, a request is received related to a new physical cable that is to be added to the building infrastructure. The request may include information regarding the cable type, connected devices and their physical locations, and additional properties related to the addition of the cable. At Step 804, the request data is matched with information stored in the cable catalog to determine whether a cable type or template corresponding to the physical cable already exists in the cable catalog. If the cable type is not found, the process terminates because the cable could not be found. If type data corresponding to the physical cable already exists, at Step 806, inventory information regarding the physical cable is requested to determine whether an appropriate cable is currently listed as being available in an inventory database. At Step 808, if a suitable cable is available in inventory, the status of the COM object may be updated to reflect that it is now in use. If a suitable cable is not available, a request may be generated to indicate that a physical cable must be purchased before the physical cable can be put into use, and a new COM object is instantiated based on the cable type information previously supplied at Step 810. At Step 812, the COM object is updated to represent the physical cable, including connectivity information and layout information. At Step 814, capacity thresholds are evaluated to determine whether the addition of the cable to the building infrastructure surpasses any of the specified stop thresholds that would halt the addition of the cable. At Step 816, if the addition of the cable does not trigger an stop threshold, the process proceeds to Step 818, where the COM object is added to the building infrastructure.

Figure 9:
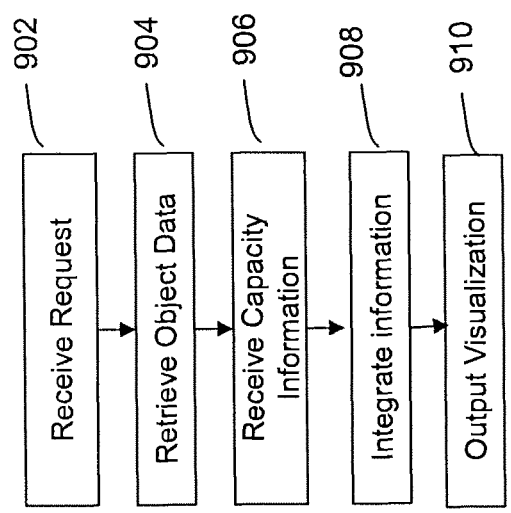
FIG. 9 is a flow diagram illustrating a process for generating a visualization of a cabling infrastructure.

FIG. 9 illustrates a process for generating a visualization of a cable object within a building infrastructure. At Step 902, a request related to a visualization of the building infrastructure is received. At Step 904, the objects related to the data contained in the request are retrieved. For example, if the request specifies a visualization of a particular cable object in the building infrastructure, the objects related to that cable may be the devices connected to its ends and the infrastructure objects through which it passes within the building infrastructure. At Step 906, capacity information related to any infrastructure objects associated with the visualization request is received. At Step 908, the capacity information, cable object information, infrastructure object information, and device information is integrated into a visualization of the building infrastructure. As shown in FIGS. 7a and 7b, if the visualization is a graphical visualization, it may provide the information in different formats. At 910, the visualization is output.

Figure 10:
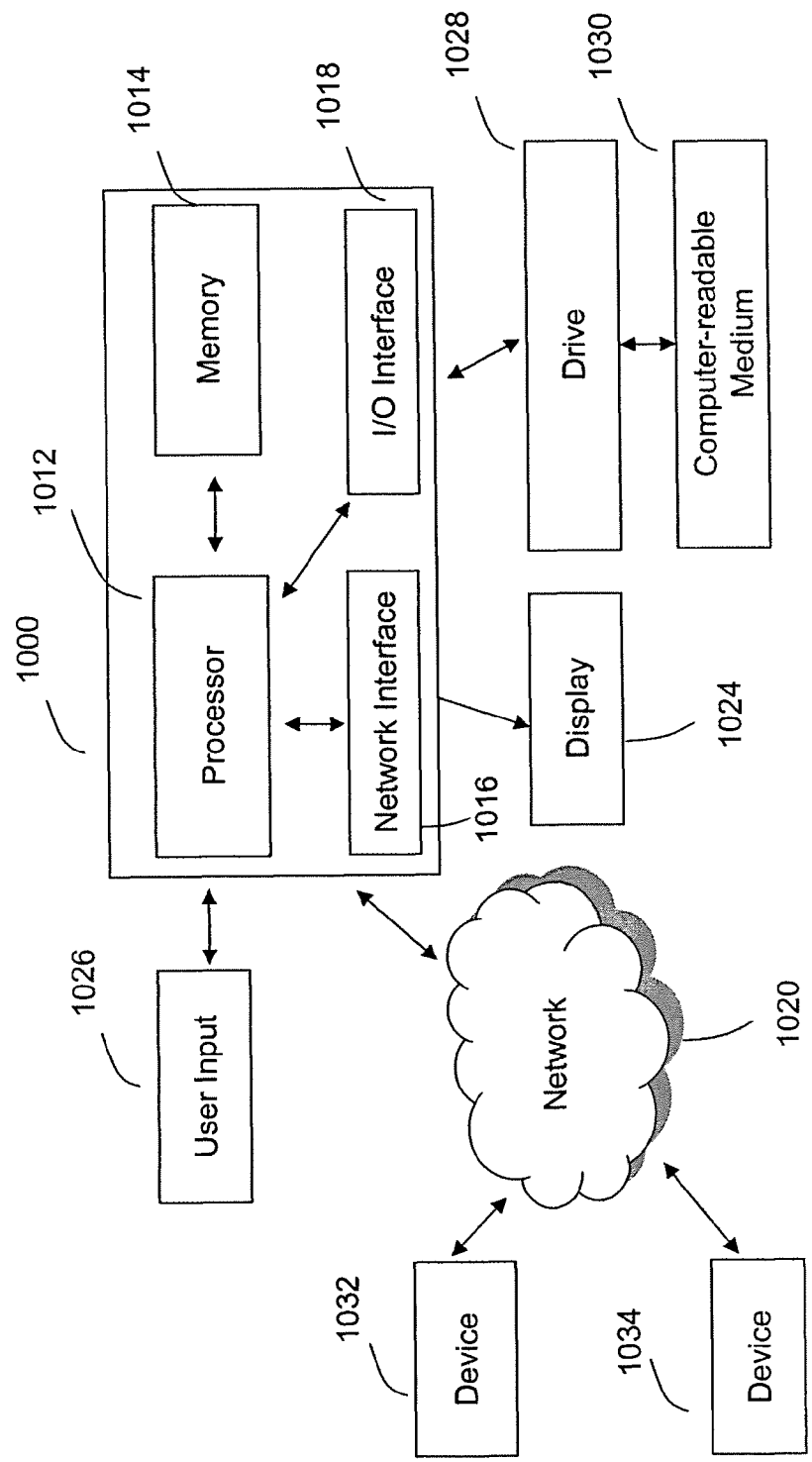
FIG. 10 is a block diagram of an exemplary networked computing environment.

A simplified hardware architecture of an example computing device 1000 is schematically illustrated in FIG. 10. Device 1000 could, for example, be an Intel x86 based computer acting as a network server, workstation, personal computer or the like. Device 1000 includes at least one processor 1012, in communication directly or indirectly through a system bus (not shown) with computer storage memory 1014, network interface 1016, and input output (I/O) interface 1018. Device 1000 may optionally include a display 1024 and user input device 1026 or the like. Processor 1012 is typically a conventional central processing unit and may be any suitable processor known to those skilled in the art. Computer storage memory 1014 includes a suitable combination of random access memory (RAM), read-only-memory (ROM), and disk storage memory used by device 1000 to store and execute software programs adapting device 1000 to function in manners exemplary of the present invention. Drive 1028 is capable of reading and writing data to or from a computer readable medium 1030 used to store software and data to be loaded into memory 1014. Computer readable medium 1030 may be a Digital Versatile Disc (DVD), Compact Disc ROM (CD-ROM), Compact Disc Rewritable (CD-RW), diskette, tape, ROM-Cartridge or the like. Input/output devices, such as user input device 1026, include but are not limited to keyboards, displays, pointing devices, etc. and can be coupled to the system either directly or through intervening I/O controllers or interfaces, such as I/O interface 1018.

Network interface 1016 is any interface suitable to physically link device 1000 to network 1020. Interface 1016 may, for example, be an Ethernet or wireless interface that that may be used to pass data from and to network 1020 or another suitable communications network. Network adapter 1026 may also be coupled to the system to enable the device 1000 to become coupled to other data processing systems or remote printers or storage devices through intervening private or public networks. Devices 1032 and 1034 may be other servers, workstations, personal computers, or other computing devices configured to communicate with device 1000 via network 1020. The hardware architectures of other computing devices, such as devices 1032 and 1034, are to be used by way of examples, individually or networked together, and are materially similar to that of device 1000, and will therefore not be further detailed.

The flowchart and block diagrams in the figures illustrate the architecture, functionality, and operation of some possible implementations of systems, methods and computer program products according to various embodiments. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A cable management system, comprising:
    a processor; and
    a non-transitory computer-readable medium having computer-readable instructions stored thereon, the non-transitory computer-readable medium including:
        at least one inventory database storing a number of cable objects, each cable object representative of a physical cable, the number of cable objects of the at least one inventory database corresponding to a number of physically available physical cables;
        a cable module configured to manage at least one cable object representative of at least one physical cable and to automatically synchronize cable availability information with the at least one inventory database based on the number of cable objects of the at least one inventory database;
        an infrastructure module configured to manage at least one infrastructure object representative of a building layout, wherein attributes of the at least one infrastructure object are associated with the at least one cable object; and
        a capacity module configured to calculate at least one utilization value associated with the at least one infrastructure object, whereby the at least one utilization value, the at least one cable object, and the at least one infrastructure object are integrated into a visualization of the building layout.

2. The cable management system of claim 1, wherein the at least one cable object is represented using a Cable Object Model.

3. The cable management system of claim 1, wherein the at least one infrastructure object is represented using an Infrastructure Object Model.

4. The cable management system of claim 1, wherein the infrastructure module is further configured to automatically synchronize infrastructure availability information with the at least one inventory database.

5. The cable management system of claim 1, wherein the capacity module is configured to determine whether the at least one utilization value exceeds at least one pre-defined threshold value.

6. The cable management system of claim 5, wherein the at least one pre-defined threshold value is at least one of a space value or weight value.

7. The cable management system of claim 5, wherein the at least one pre-defined threshold value is less than a maximum capacity value.

8. The cable management system of claim 1, wherein the visualization comprises a graphical display that illustrates an actual path of the at least one cable object through the at least one infrastructure object.

9. The cable management system of claim 8, wherein the graphical display of the actual path is based at least in part on the at least one utilization value.

10. The cable management system of claim 8, wherein the graphical display comprises an isometric view of the actual path of the at least one cable object, wherein the isometric view shows at least two cabling layers.

11. A computer-implemented cable management method, comprising:
    creating at least one cable object that is representative of at least one physical cable;
    creating at least one infrastructure object that is representative of at least one physical infrastructure organization component in a building infrastructure, wherein attributes of the at least one infrastructure object are associated with the at least one cable object;
    automatically synchronizing cable availability information with at least one inventory database, the at least one inventory database storing a number of cable objects, each cable object representative of a physical cable, the number of cable objects of the at least one inventory database corresponding to a number of physically available physical cables; and
    generating a representation of a layout associated with the at least one cable object and the at least one infrastructure object, wherein the representation of the at least one infrastructure object includes a color corresponding to at least one utilization value.

12. The computer-implemented cable management method of claim 11, further comprising automatically synchronizing infrastructure availability information with the at least one inventory database.

13. The computer-implemented cable management method of claim 11, wherein creating at least one cable object comprises instantiating an object based on a Cable Object Model.

14. The computer-implemented cable management method of claim 13, wherein instantiating an object based on a Cable Object Model further comprises retrieving information from a cable catalog.

15. The computer-implemented cable management method of claim 11, wherein generating a representation of a layout further comprises incorporating the layout into a graphical representation of the building infrastructure, wherein the layout corresponds to an actual path of the at least one physical cable.

16. The computer-implemented cable management method of claim 11, wherein creating at least one infrastructure object comprises instantiating an object based on an Infrastructure Object Model.

17. The computer-implemented cable management method of claim 11, wherein generating a representation of a layout further comprises altering the representation of the layout based on at least one of a weight utilization or space utilization.

18. The computer-implemented cable management method of claim 17, wherein the weight utilization is calculated based on attributes of the at least one cable object and the at least one infrastructure object.

19. The computer-implemented cable management method of claim 17, wherein the space utilization is calculated based on attributes of the at least one cable object and the at least one infrastructure object.

20. The computer-implemented cable management method of claim 11, further comprising determining whether the at least one utilization value exceeds at least one pre-defined threshold value.

21. The computer-implemented cable management method of claim 20, wherein the at least one pre-defined threshold value is less than a maximum capacity.

22. A non-transitory computer-readable medium having computer-readable instructions stored thereon to cause a computer to execute a process comprising:
   creating at least one cable object that is representative of at least one physical cable;
   creating at least one infrastructure object that is representative of at least one physical infrastructure organization component in a building infrastructure, wherein attributes of the at least one infrastructure object are associated with the at least one cable object;
   automatically synchronizing cable availability information with at least one inventory database, the at least one inventory database storing a number of cable objects, each cable object representative of a physical cable, the number of cable objects of the at least one inventory database corresponding to a number of physically available physical cables, the automatically synchronizing cable availability information including decrementing the number of cable objects of the at least one inventory database in response to the creation of the at least one cable object; and
   generating a representation of a layout associated with the at least one cable object and at least one infrastructure object, wherein at least one utilization value is incorporated into the representation.

* * * * *